United States Patent Office 3,251,115
Patented May 17, 1966

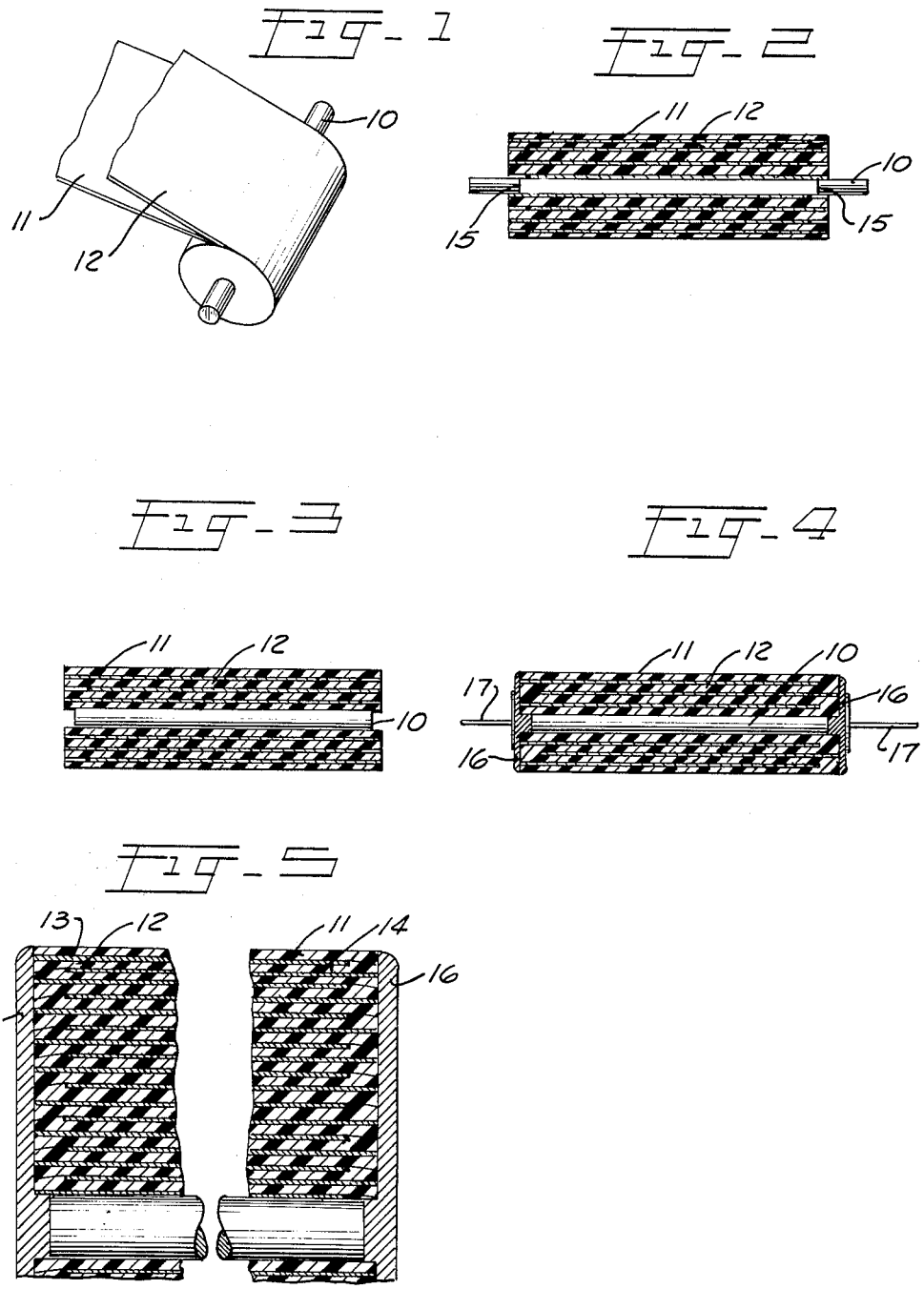

3,251,115
METHOD OF MAKING WOUND CAPACITORS
Winfried Pfeiffer, Visalia, Calif., assignor to The Gudeman Company, Chicago, Ill., a corporation of Illinois
Filed Dec. 2, 1963, Ser. No. 327,271
3 Claims. (Cl. 29—25.42)

This invention relates to a method of making wound capacitors and more particularly to the construction of small or miniature wound capacitors.

The conventional method of fabricating a wound capacitor consisting of a dielectric and foil or conductive coating forming the conductor is to use an arbor which may be either solid or split. The winding is formed on the arbor and is removed therefrom for further processing. For small or miniature capacitors the arbor is normally about 1/16" diameter and the winding may consist of a relatively small number of turns about the arbor.

After removal of the arbor the winding has been suitably masked to seal off the arbor hole and to prevent penetration of metal spray after which the ends of the winding have been spray metallized. Terminal leads are then attached to the metallized ends by soldering or similar means of connection. It has been important in this operation to seal the arbor opening in the winding since entrance of metal spray into the opening might cause an internal short circuiting or at least appear as foreign material affecting the reliability of the capacitor. Because of the small size and fraility of the windings the size to which they could be made has been limited and even so they are extremely apt to be damaged during the metallizing operation and subsequent operations due to the weakness of their cross section.

It is accordingly one of the objects of the present invention to provide a method of making wound capacitors according to which extremely small capacitors may be produced having improved accuracy and reliability and improved ruggedness over conventional capacitors heretofore available.

Another object is to provide a method of making wound capacitors which produces an improved dissipation factor due to the quality of the contact between the terminations and the conducting films.

According to a feature of the invention, the capacitor is formed by winding dielectric strips and conducting foils or films on an insulated arbor whose ends are subsequently broken off slightly within the ends of the winding and which remains as a permanent part of the complete capacitor. The arbor accurately supports the winding and adds strength thereto both during the manufacturing process and in the completed capacitor, as well as serving as a mask or seal for the arbor hole in the winding during metallizing of the ends of the winding.

The above and other objects and features of the invention will be more readily apparent from the following description when read in connection with the accompanying drawing, in which:

FIG. 1 is a perspective view illustrating the step of winding the films or strips on an arbor;

FIG. 2 is a section through the completely wound capacitor;

FIG. 3 is a view similar to FIG. 2 showing the ends of the arbor broken off;

FIG. 4 is a view similar to FIGS. 2 and 3 showing the metallized ends in place; and FIG. 5 is an enlarged partial section similar to FIG. 4.

In making a capacitor according to the present invention an elongated arbor 10 of insulating material, such as a plastic rod, is utilized for the winding. Two strips 11 and 12 of dielectric material are wound on the arbor simultaneously in overlapping relationship, as is conventional. Conducting foils or films, as shown at 13 and 14 and as best seen in FIG. 5, are wound between the dielectric strips 11 and 12 with the foil or film 13 extending completely to one edge of the strips and terminating short of the other edge while the foil or film 14 extends completely to the other edge and terminates short of the one edge. The conducting films 13 and 14 may be in the form of thin metal foil or may be metallized coatings on the dielectric strips. In either case, both the dielectric strips and the conductor strips are extremely thin, being shown exaggerated in size on the drawing, so that when several strips are tightly wound on the arbor the edge portions of the dielectric strips will seal together over the edges of the conductor strips which terminate short of the edges of the dielectric strips.

After winding the dielectric and conductor strips on the arbor to the desired number of turns the assembly will appear as shown in section in FIG. 2. The arbor at this time is still of full length and the windings are wrapped tightly around it. Preferably the arbor is scored or similarly weakened along lines as shown at 15 which lie within the ends of the winding a distance less than the spacing of the conductor strips from the ends of the windings. This detail is more readily apparent from FIG. 5.

The next step in the process is to break off the ends of the arbor at the score lines 15 to leave the partially completed unit in the condition shown in FIG. 3. It will be noted from this figure that the arbor remains in place in the windings which is still tightly wound on the arbor with the ends of the arbor terminating slightly within the ends of the winding and completely sealing the ends of the winding.

After breaking off the ends of the arbor, as described above, metal is sprayed on the ends of the winding, as shown at 16, in FIG. 4. This spraying operation may be performed in the conventional manner except that no masking is necessary because the arbor itself performs the essential masking function. Closing of the dielectric strips together over the recessed ends of the conductor strips will prevent ingress of any spray metal to the recessed ends of the conductor strips and the ends of the arbor will limit the extent to which spray metal may enter the arbor opening. As the ends 16 are sprayed, the spray metal will make contact with the exposed edges of the conducting films 13 and 14 which extend completely to the ends of the winding.

Upon completion of the ends 16 terminals 17 may be soldered or otherwise connected thereto in the usual manner. These terminals are normally relatively thin coated wire which may be bent into a loop to overlie the coated metal ends 16 so that it can be easily and securely soldered thereto. This completes the unit except for an enclosing covering, not shown, which may be a metal can, a plastic covering or any other desired type of enclosure as is conventional.

It will be seen that the capacitor can be easily formed according to the method described above and can maintain an extremely high degree of accuracy. This is due in large measure to the fact that the arbor remains in place on the winding during all of the processing and as a part of the completed capacitor to add strength and rigidity to the winding and to effect sealing of the ends of the arbor opening. There is no possibility, therefore, of the dielectric or conductor strips shifting during the processing or of being damaged otherwise, as may occur when the arbor is removed after winding and prior to additional processing.

While one embodiment of the invention has been shown and described herein, it will be understood that it is illustrative only and not to be taken as a definition of the scope of the invention, reference being had for this purpose to the appended claims.

What is claimed is:

1. The method of making a wound capacitor which comprises winding centrally on an arbor of insulating material two strips of dielectric material of less width than the arbor length with conductor films between the strips and with both ends of the arbor projecting beyond the edges of the strips, one of the conductor films terminating short of one end and extending to the other end of the wound strips and the other conductor film terminating short of the other end and extending to said one end of the wound strips, breaking off the ends of the arbor within but adjacent to the ends of the wound strips at points beyond the adjacent spaced edges of the conductor films while leaving the central portion of the arbor within the wound strips and depositing metal over the ends of the wound strips and within the central openings at the ends thereof and over the ends of the arbor portion therein to establish contact with the films respectively at the ends of the wound strips and within the central openings at the ends thereof.

2. The method of claim 1 in which the metal is deposited by spraying molten metal over the ends of the wound strips and arbor portion.

3. The method of claim 1 including the further step of soldering terminals to the deposited metal.

References Cited by the Examiner

UNITED STATES PATENTS

| | | | |
|---|---|---|---|
| 859,923 | 7/1907 | Davis | 317—260 |
| 2,323,020 | 6/1943 | Dorn | 317—260 |
| 2,942,302 | 6/1960 | Beyer | 317—260 X |
| 3,004,197 | 10/1961 | Rodriguez | 317—260 X |
| 3,163,917 | 1/1965 | Bilsing | 317—260 X |

ROBERT K. SCHAEFER, *Primary Examiner.*

JOHN F. BURNS, ELLIOT A. GOLDBERG,
*Assistant Examiners.*